(12) United States Patent
Padden

(10) Patent No.: US 7,518,952 B1
(45) Date of Patent: Apr. 14, 2009

(54) SONAR SENSOR ARRAY SIGNAL DISTRIBUTION SYSTEM AND METHOD

(75) Inventor: Robin Padden, West Jordan, UT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 238 days.

(21) Appl. No.: 11/517,662

(22) Filed: Sep. 8, 2006

Related U.S. Application Data

(60) Provisional application No. 60/715,662, filed on Sep. 9, 2005.

(51) Int. Cl.
*H01P 3/06* (2006.01)
*H04B 3/00* (2006.01)

(52) U.S. Cl. .................................................. 367/131
(58) Field of Classification Search ................ 367/131; 333/127
See application file for complete search history.

(56) References Cited

U.S. PATENT DOCUMENTS

| | | | |
|---|---|---|---|
| 3,048,780 A * | 8/1962 | Diambra et al. ............. 333/127 |
| 3,100,893 A * | 8/1963 | Brueckmann ................ 333/32 |
| 3,452,320 A * | 6/1969 | Kempf ....................... 439/587 |
| 3,652,979 A | 3/1972 | Angelle |
| 3,990,036 A | 11/1976 | Savit |
| 4,011,551 A | 3/1977 | Adler |
| 4,408,307 A | 10/1983 | Harris |
| 5,148,144 A | 9/1992 | Sutterlin et al. |
| 5,729,824 A * | 3/1998 | O'Neill et al. .............. 333/132 |
| 6,041,282 A | 3/2000 | Wardeberg et al. |
| 6,173,899 B1 | 1/2001 | Rozin |
| 6,580,751 B1 | 6/2003 | Gardner et al. |
| 6,607,050 B2 | 8/2003 | He et al. |
| 6,982,925 B2 | 1/2006 | Maas et al. |
| 6,998,876 B1 | 2/2006 | Conn |

* cited by examiner

*Primary Examiner*—Dan Pihulic
(74) *Attorney, Agent, or Firm*—Thorpe North & Western, LLP

(57) ABSTRACT

A system and method for signal distribution within a sensor array uses a coaxial transmission line. Taps are affixed to the outer conductor of the coaxial transmission line and include field coupling portions extending into the internal field region of the coaxial transmission line. Electromagnetic energy propagating within the transmission line can be extracted to power the sensors. Sensor signals can be modulated onto radio frequency signals and propagated along the transmission line to distribute the sensor signals.

27 Claims, 7 Drawing Sheets

SONAR SENSOR ARRAY SIGNAL DISTRIBUTION SYSTEM AND METHOD

This application claims the benefit of Provisional Patent Application Ser. No. 60/715,662, entitled "Hull Sensor Array Apparatus and Method," filed Sep. 9, 2005, and hereby incorporated by reference.

BACKGROUND OF THE INVENTION

1. Field of the Invention

The present invention relates generally to devices for sonar sensor arrays. More particularly, the present invention relates to a system and method of signal distribution for a sonar sensor array.

2. Related Art

Sonar systems are used on a variety of platforms including submarines, surface ships, sonobuoys, ground vehicles, aircraft, and shore stations. Sonar arrays use a large number of hydrophones to provide improved sensitivity and directional resolution. Sophisticated sonar arrays may include hundreds of individual hydrophones. These hydrophones are placed in the water and attached or towed behind the platform. Typically, a vast array of cables and connectors are used to electrically connect the hydrophones to the platform employing the sonar. For example, a separate cable from each hydrophone to the sonar equipment is often included to allow the individual signals from each hydrophone to be processed by the sonar equipment for electronic beam forming or source direction estimation.

A large sonar array having hundreds of sensors may include thousands of connectors and millions of feet of cable. In submarine applications, the array may be mounted on the submarine hull and use hundreds of hull penetrators. Failures in the water tightness of these components can adversely affect the reliability of the sonar array and even threaten the integrity of the submarine. Interconnection complexity not only results in high costs for acquisition and installation of a sonar array, but adds ongoing costs for maintenance of the system. For very large sonar arrays, for example having thousands of hydrophones, the interconnection complexity and cost is an obstacle to deploying such large arrays.

SUMMARY OF THE INVENTION

It has been recognized that it would be advantageous to develop a technique for distribution of signals in a sonar sensor array which can help to reduce the amount of cabling used.

In one embodiment of the present invention, a signal distribution system includes a coaxial transmission line. A plurality of taps is affixed to an outer conductor of the coaxial transmission line along a length of the coaxial transmission line. Each of the taps has at least one field coupling portion extending through an opening in the outer conductor into an internal field region of the coaxial transmission line. The taps interface with electromagnetic wave energy propagating within the coaxial transmission line.

Additional embodiments of the present invention include a method of installing a sonar array on a platform and a method of distributing signals within a sonar array.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Figure 1:
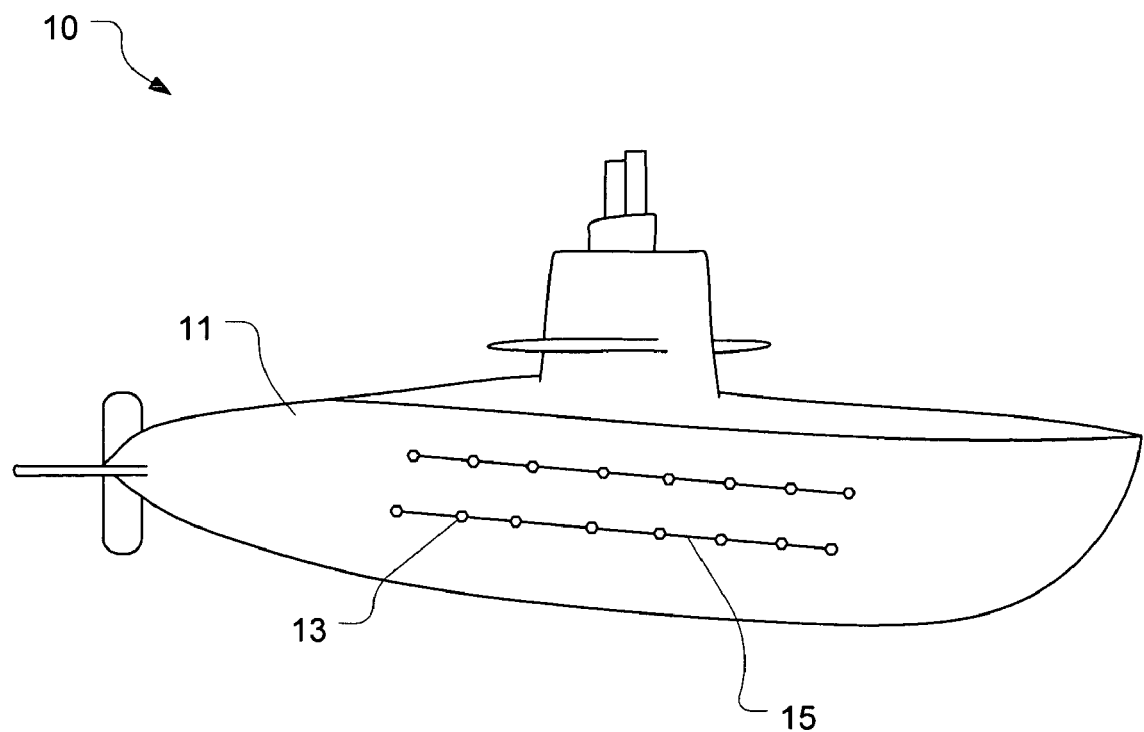
FIG. 1 is a side perspective illustration of a platform having a sonar sensor array system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2A:
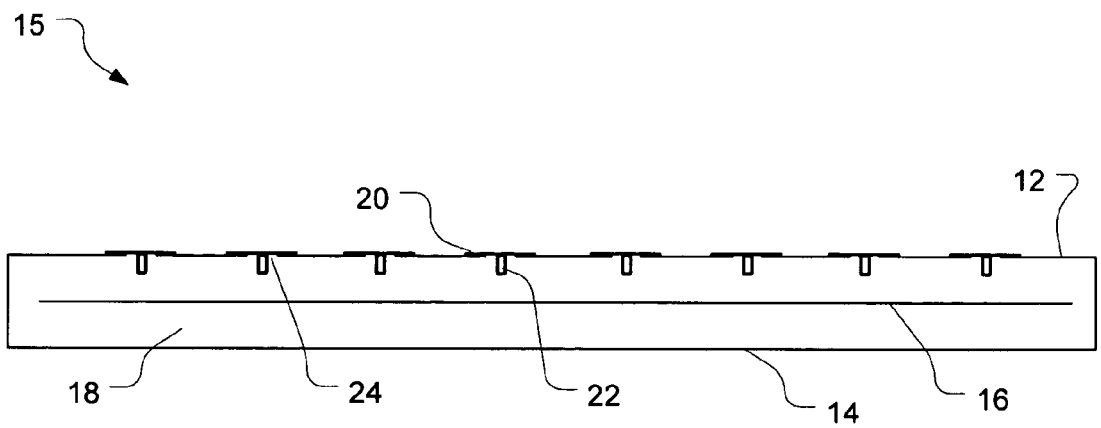
FIG. 2(a) is a side cross-sectional view of a signal distribution system for a sonar sensor array in accordance with an embodiment of the present invention.
Figure 2B:
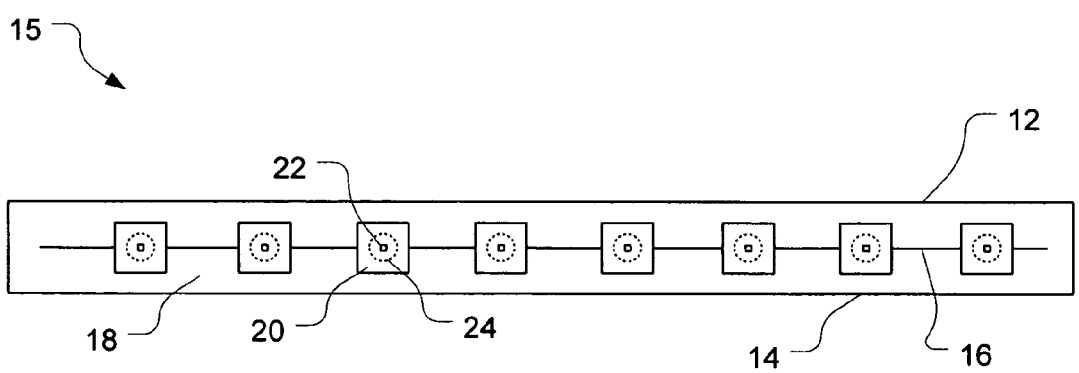
FIG. 2(b) is a top view of the signal distribution system of FIG. 2(a)

In accordance with an embodiment of the present invention, FIG. 1 illustrates a sonar array system, shown generally at 10, installed on a platform 11 (illustrated here as a submarine) having an array of sensors 13 (e.g. sonar hydrophones) mounted thereto and interfaced to the signal distribution system 15. The signal distribution system includes a confinement means for confining a transverse electric and magnetic (TEM) mode electromagnetic wave within a watertight, elongate wave-propagating region. For example, as illustrated in FIGS. 2(a) and 2(b), the confinement means can be provided by a coaxial transmission line 12, having an outer conductor 14 and an inner conductor 16 separated by an internal field region 18.

The confinement means (e.g., coaxial transmission line 12) further includes plural means for interfacing to the elongate wave-propagating region and coupling to at least one electromagnetic wave therein. For example, the interfacing means can be a tap 20 affixed to the outer conductor 14 of the coaxial transmission line 12. The tap can include a field coupling portion 22 extending through an opening 24 in the outer conductor into the internal field region of the coaxial transmission line. The field coupling portion can provide for injecting a data-signal carrying electromagnetic wave into the coaxial transmission line. The field coupling portion can also provide for extracting electrical power from an electromagnetic wave propagating in the coaxial transmission. For example, the field coupling portion can be excited by an applied voltage or current to inject a propagating electromagnetic wave into the internal field region as described further below. As another example, the field coupling portion can be excited by an electromagnetic wave propagating within the internal field region and a voltage or current extracted as described further below.

Figure 3:
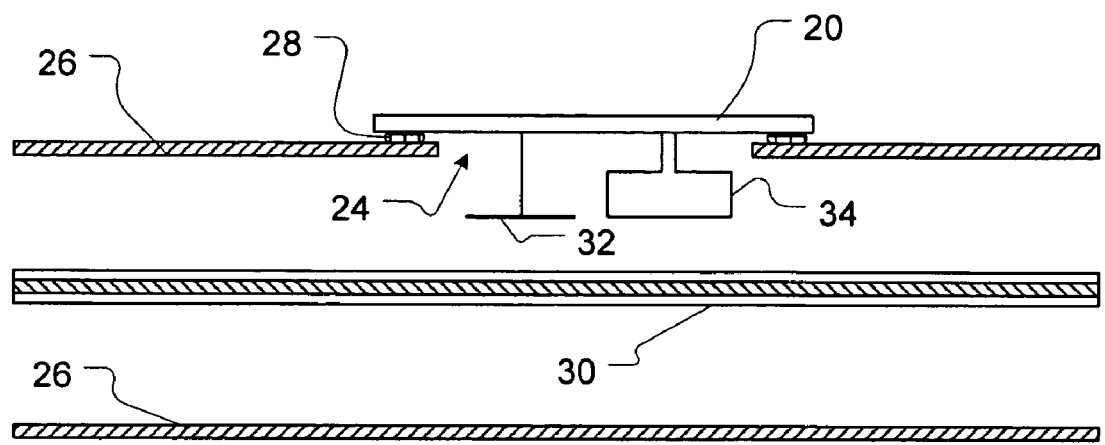
FIG. 3 is a side cross-sectional view showing detail of tap for a signal distribution system in accordance with an embodiment of the present invention.

Various configurations of the taps 20 can be used in embodiments of the present invention as will now be described. For example, the field coupling portion 22 of the tap can be configured to capacitively or inductively couple to the internal field region 18. FIG. 3 illustrates a detailed illustration of one embodiment of a tap 20 installed in a coaxial transmission line. The tap extends through an opening 24 in a water tight outer conductor 26 of the coaxial transmission. For example, the coaxial transmission line can be formed using a rigid metal outer conductor to which the tap is affixed using screws or rivets. A rigid metal conductor can prove helpful in maintaining watertight integrity for deep sea submersible platforms. An insulated wire 30 can be included inside the metal outer conductor to form a TEM mode transmission line. As another example, a waveguide, such as WR-90 can be converted into a TEM mode transmission line by insertion of an internal conductor. Of course, various other types and sizes of outer conductors can be used. A seal 28, such as a gasket, o-ring, or the like, can be provided between the tap and the watertight outer conductor to maintain the watertight integrity of the coaxial transmission line. Alternately, glue, epoxy, a welded connection, or other combinations can be used with or in place of the seal to affix the tap to the coaxial transmission line and provide a watertight connection between the tap and the outer conductor. The internal field region 18 may be filled with a dielectric, air or gas.

The tap 20 can include one or more field coupling portions, such as a capacitively-coupled probe 32, an inductively coupled probe 34, or both. Capacitive-coupling and inductive coupling can be used for either injection or extraction of signals to/from the internal field region 18. A capacitively-coupled probe can provide relatively high impedance (e.g., 50 Ohms, 75 Ohms, or higher) which is convenient for driving by a modulator to inject an electromagnetic wave energy into the internal field region. Capacitive coupling can also provide wide bandwidth, which is helpful if a wide range of different frequencies are to be injected by the taps. An inductively-coupled probe can provide relatively low impedance (e.g., 12 Ohm) which is convenient for coupling to a power conditioner to extract power from the internal field region to power the sensor 13 or other components. Of course other impedances and combinations can be used. For example, inductive coupling may be used for injection and capacitive coupling used for extraction.

Using inductive-coupling or capacitive-coupling to obtain power from the internal field region 18, rather than a direct electrical connection to the inner conductor 16, provides an advantage in that taps 20 need not be spliced or wired to the inner conductor. For example, the tap can be inserted through the opening 24 in the outer conductor 14 and then screwed or otherwise fixed to the outer conductor. Soldering and splicing may therefore be avoided. In addition to reducing the complexity and cost of installation, reliability may be improved as there are fewer connection points which may fail.

Figure 4:
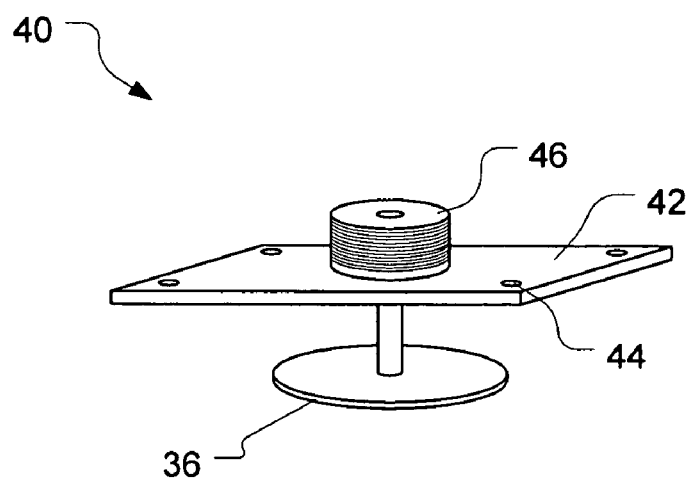
FIG. 4 is a side perspective view of a capacitively-coupled tap in accordance with an embodiment of the present invention.

FIG. 4 illustrates a detailed embodiment of a capacitively-coupled probe assembly 40 configured for installation as a tap. The assembly includes a mounting plate 42 having mounting holes 44 for attachment to the exterior conductor of the coaxial transmission line. The assembly includes a plate 36 which can extend through an opening in the exterior conductor into the internal field region of the coaxial transmission line. The plate extends longitudinally and circumferentially within the internal field region. The assembly is referred to as a capacitively-coupled probe because the plate presents primarily capacitive impedance when referenced to the exterior conductor. In other words, the plate primarily couples to the electric field component of electromagnetic waves traveling within the coaxial transmission line. Although the plate is shown here as being flat, the plate can also be curved. For example, for an external conductor having a generally tubular shape, the plate may be curved to maintain a relatively constant distance from the exterior conductor. In general, it is desirable for the plate to follow lines of roughly equal electric field potential within the internal field region to maintain high efficiency of the injection/extraction and minimize loss to signals propagating through the transmission line. Note, however, that the plate need not be perfectly aligned with lines of equal electric field potential, as some loss can be accommodated by the signal distribution system. The assembly can also include a connector 46 which may be used for attachment to a sensor to receive a sensor signal from the sensor. Alternately, the sensor may be attached directly to the tap and the connector eliminated.

Figure 5:
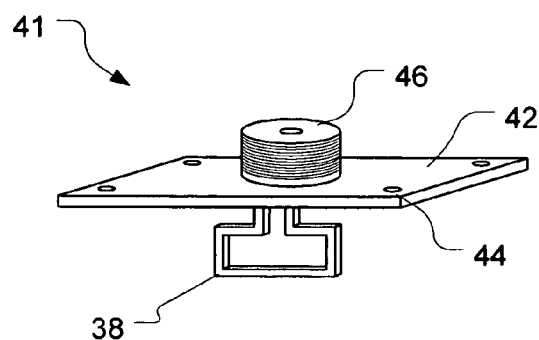
FIG. 5 is a side perspective view of an inductively-coupled tap in accordance with an embodiment of the present invention.

FIG. 5 illustrates a detailed embodiment of an inductively-coupled probe assembly 41. The assembly includes a loop 38 which extends longitudinally and radially within the internal field region. The loop presents primarily inductive impedance when viewed at the connection points near the mounting plate 42. The loop primarily couples to the magnetic field component of electromagnetic waves traveling within the coaxial transmission line. It is desirable for the loop to be oriented perpendicular to the magnetic field lines to maintain high efficiency in the injection/extraction process and to minimize loss to signals propagating through the transmission line. Hence, the loop extends primarily in the radial and longitudinal directions along the transmission line. Note, however, that the loop need not be perfectly aligned, as some loss can be accommodated by the signal distribution system.

Another embodiment of a tap can include both a capacitively-coupled probe and an inductively-coupled probe. The plate of the capacitively-coupled probe can be mounted inside the wire loop of the inductively-coupled probe, for example, to save space.

Figure 6:
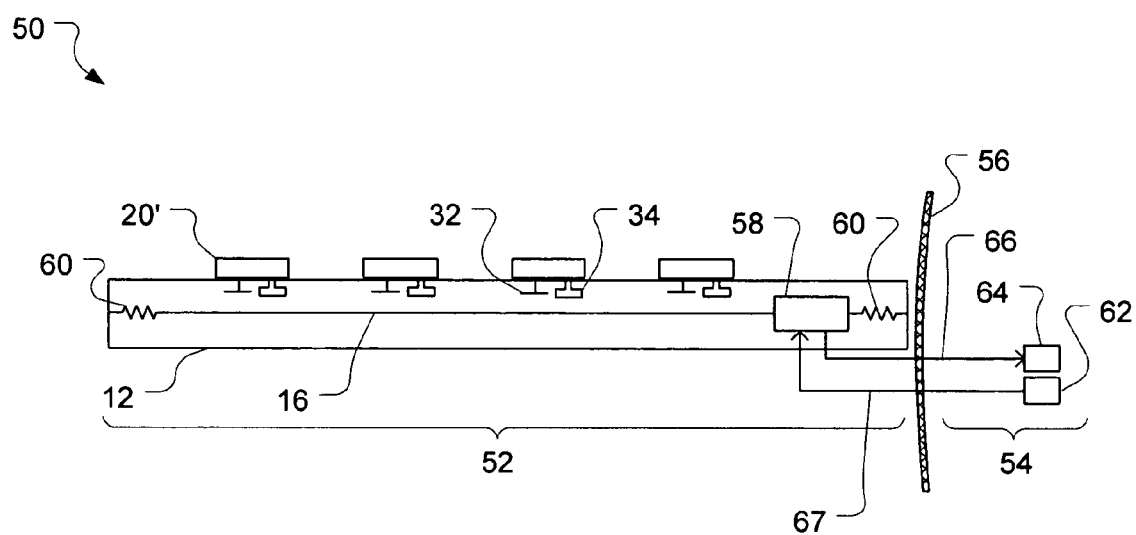
FIG. 6 is a side view of a signal distribution system in accordance with an embodiment of the present invention.

Operation of the signal distribution system will be further illustrated by an exemplary sonar array system illustrated in FIG. 6, in accordance with an embodiment of the present invention. The sonar array system, shown generally at 50, includes an exterior portion 52 mounted on the exterior of the platform hull 56, and an interior portion 54 mounted inside the hull. The exterior portion includes a signal distribution subsystem, which includes a coaxial transmission line 12 having an outer conductor 14 and inner conductor 16. The transmission line is used to provide power to a plurality of array sensors and to communicate sensor signals to the interior portion. Communications through the hull can be wired, for example by extending the transmission line through a hull penetrator, or communications can be through a transformer.

Figure 7:
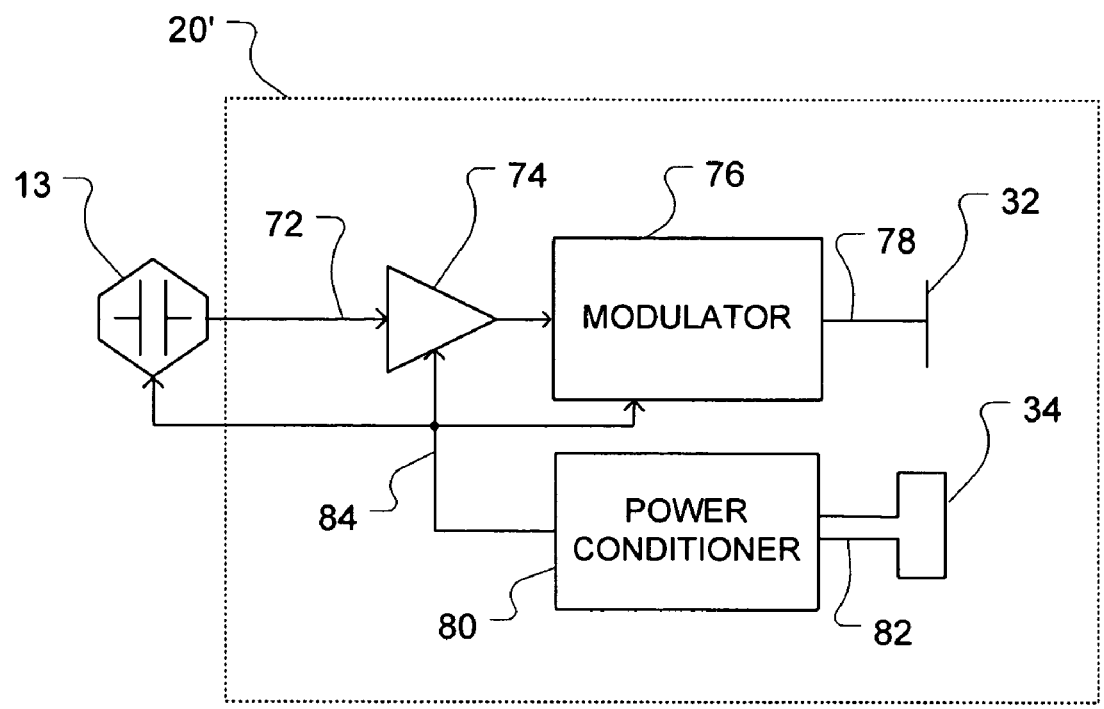
FIG. 7 is a block diagram of an exemplary tap of the signal distribution system of FIG. 6.

Coupled to the coaxial transmission line 12 is a plurality of taps 20'. The taps provide for interfacing to the sensors and insertion/extraction of propagating electromagnetic waves to/from the coaxial transmission line. FIG. 7 illustrates a detailed block diagram of a tap 20'. The tap includes a power conditioner 80 coupled to an inductively-coupled probe 34. The power conditioner accepts electromagnetic energy 82 extracted by the inductively-coupled probe from a first electromagnetic wave within the coaxial transmission line and conditions the energy to form a power signal 84. The power signal can also be used to power the sensor 13 and internal components of the tap described further below.

The tap 20' also includes a modulator 76 coupled to a capacitively-coupled probe 32. The modulator accepts a sensor signal 72 from the sensor 13. The sensor signal is modulated onto a radio frequency signal 78 and output to the capacitively-coupled probe. The capacitively-coupled probe injects the modulated radio frequency signal into the coaxial transmission line as a second electromagnetic wave, allowing it to propagate to a receiver described in further detail below. Multiple taps coupled to corresponding multiple sensors can inject a plurality of second electromagnetic waves, each being a modulated radio frequency signal carrying a corresponding sensor signal. For simplicity, the second electromagnetic waves will be referred to as "data signals."

As the sensor signals 72 can be small, it may be desirable to include a preamplifier 74 to increase the amplitude of the sensor signal. Power 84 for the preamplifier 74 and the modulator 76 can be provided by the power conditioner 80. It may also be helpful to include a radio frequency amplifier (not shown) after the modulator to increase the power of the modulated radio frequency signal, which can also be powered by the power conditioner.

Returning to FIG. 6, the first electromagnetic wave within the coaxial transmission line can be generated by a power source 62. Because the coaxial transmission line is operated in a TEM mode, there is no lower frequency cutoff for the transmission line, so low frequencies can be used for the power signal, such as 10 MHz or lower. It will be appreciated that the lower the frequency, the lower the amount of coupling the inductively-coupled probe will provide, and the less efficient power extraction will be. For example, at a very low frequency (e.g. 60 Hz, 400 Hz) it is difficult to obtain enough power from a small inductively-coupled probe. Conversely, the higher the frequency of the power signal, the more expensive the power source is and the more potential loss there is in the various components. It has been determined that using a frequency of about 1 MHz for the power signal provides good performance, although a different frequency can be used. The first electromagnetic wave generated by the power source may be injected into the coaxial transmission line using a diplexer 58. As an alternative to a diplexer, a directional coupler may be used as described further below.

The data signals (second electromagnetic waves) injected by the taps 20' propagate along the coaxial transmission line 12 and can be extracted with the diplexer 58 and provided to a receiver 64 located inside the hull 56. As an alternative, separate diplexers can be used for the first electromagnetic wave injection and second electromagnetic wave extraction. As another alternative, one end of the coaxial transmission can penetrate the hull. As another alternative, both ends of the coaxial transmission line can penetrate the hull, and diplexers located at each end of the coaxial transmission line, one for power injection and one for signal extraction. It should be appreciated that one or two hull penetrators can be used, reducing the number of hull penetrations as compared to running a separate cable to each sensor.

Figure 8:
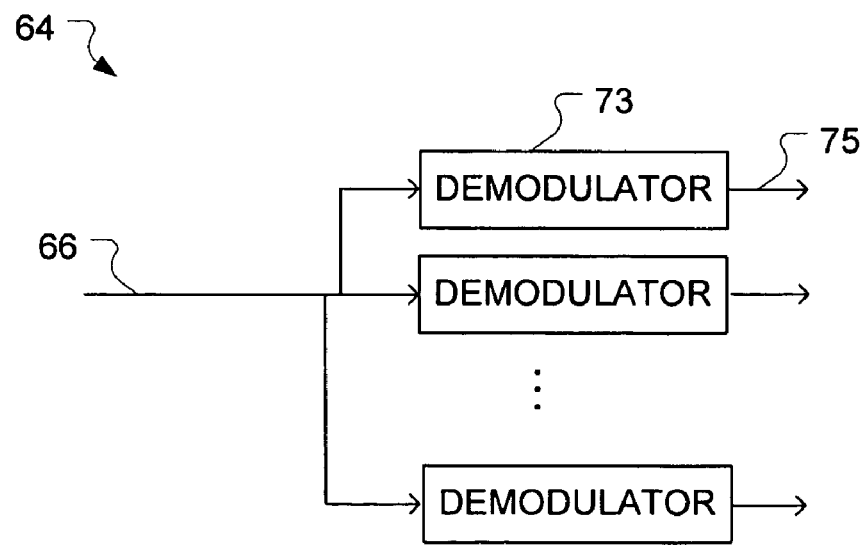
FIG. 8 is a block diagram of the receiver portion of the signal distribution system of FIG. 6.

As shown in FIG. 8, the receiver 64 can include a plurality of demodulators 73 to recover corresponding sensor signals 75 from the data signals 66 (extracted second electromagnetic waves). For example, the modulators 76 can be frequency modulation transmitters, and the demodulators 73 can be frequency modulation receivers. Each tap 20' can modulate the sensor signal 72 onto a different frequency radio frequency signal, as is known as frequency division multiplexing. The demodulators can each be tuned to a unique frequency corresponding to the frequency of the radio frequency signal for a corresponding sensor and tap.

Frequency modulation provides several desirable characteristics. For example, frequency modulation provides the ability to have high dynamic range, which can be helpful for high quality sensors. For example, dynamic range of 70-90 dB may be desired for some sonar applications and can be achieved with embodiments of the present invention. Even inexpensive frequency modulators can provide high dynamic range and low noise. Modulating the sensor signal in an analog format onto the radio frequency signal helps to avoid the expense of digital to analog converters or similar conversion circuitry and the resulting noise and artifacts that may be introduced. Another advantage is the ability to maintain timing alignment (constant group delay) of the sensor signals through the distribution system which can be desirable in direction finding and beam forming applications.

Of course, other modulation and multiplexing schemes can be used as well. Amplitude modulation, phase modulation, and other schemes may also be used in embodiments of the invention, and may provide desirable advantages depending on unique requirements for the particular application of the sonar array system 50. A digital modulation scheme may be used as well.

Because a coaxial transmission line is wide bandwidth, nearly unlimited capacity is available for propagation of the modulated sensor signals. For example, in an embodiment, a frequency range of 70 MHz to 120 MHz can provide 250 separate sensor signal channels (a sensor channel being defined as a corresponding modulator and demodulator for one sensor) using frequency modulation transmitters on a 200 kHz channel spacing with 15 kHz frequency deviation.

Time division multiple access or code division multiple access can be used in embodiments of the invention to allow some or all of the taps to use the same frequency for the radio frequency signals. Amplitude modulation, phase modulation, and other schemes may also be used in the invention, and may provide desirable advantages depending on application specific requirements for the particular application of the sonar array system 50.

The coaxial transmission line 12 may include termination resistors 60 at each end to help maintain a low standing wave ratio. For example, the ends of the inner conductor 16 can be electrically connected to the outer conductor 14 on an inner surface at the ends (e.g., through non-reactive resistors) whose resistance value equals the characteristic, or surge, impedance of the coaxial transmission line, so as to minimize the variation of coupling magnitude between different taps which are positioned at different locations and may use different frequencies. This can help to maintain a constant gain between the sensor signal 72 input to the taps 20 and the sensor signal output 75 from the receiver 64.

The operation of the sonar array system 50 will now be summarized. Electromagnetic wave energy at a first frequency is propagated along the coaxial transmission line 12. The energy at the first frequency can be inductively extracted at a plurality for first points distributed along the coaxial transmission line, and used to supply power for the sensors 13. The first frequency electromagnetic wave can be generated by a power source 62. A plurality of second electromagnetic waves can be capacitively injected into the coaxial transmission line at a plurality of second points. The second electromagnetic waves comprise sensor signals 72 from the sensors 13. For example, the sensor signals may be modulated onto radio frequency signals to form the second electromagnetic waves. The receiver 64 receives the plurality of second electromagnetic waves and extracts the plurality of sensor signals 75, for example using demodulators 73. Corresponding first and second points can be the same point (e.g., using a combined injection/extraction tap 20'), or at different points (e.g., using separate capacitively-coupled probe 40 and inductively-coupled probe 41).

Figure 9:
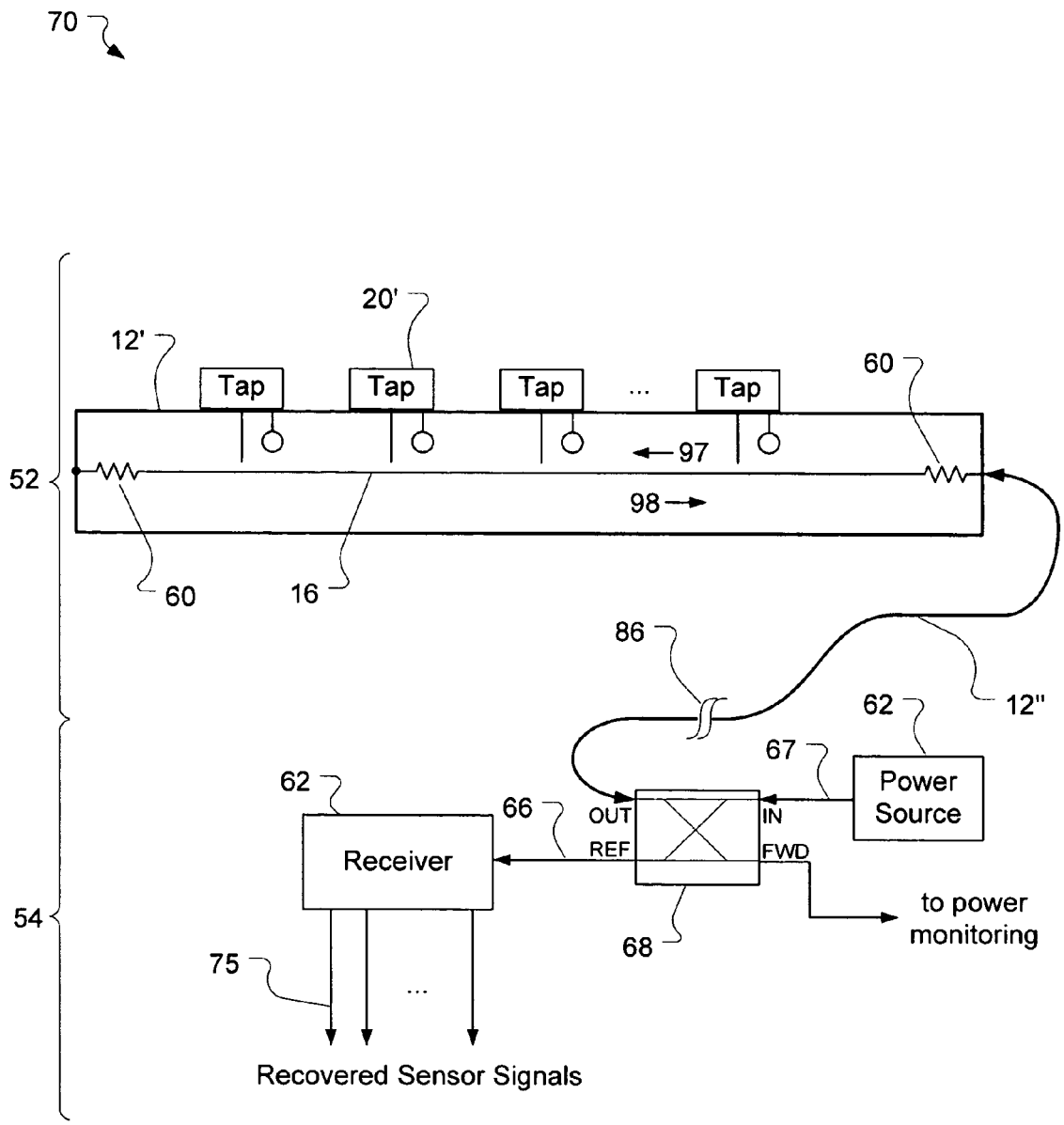
FIG. 9 is a schematic diagram of a signal distribution system in accordance with another embodiment of the present invention.
Figure 10:
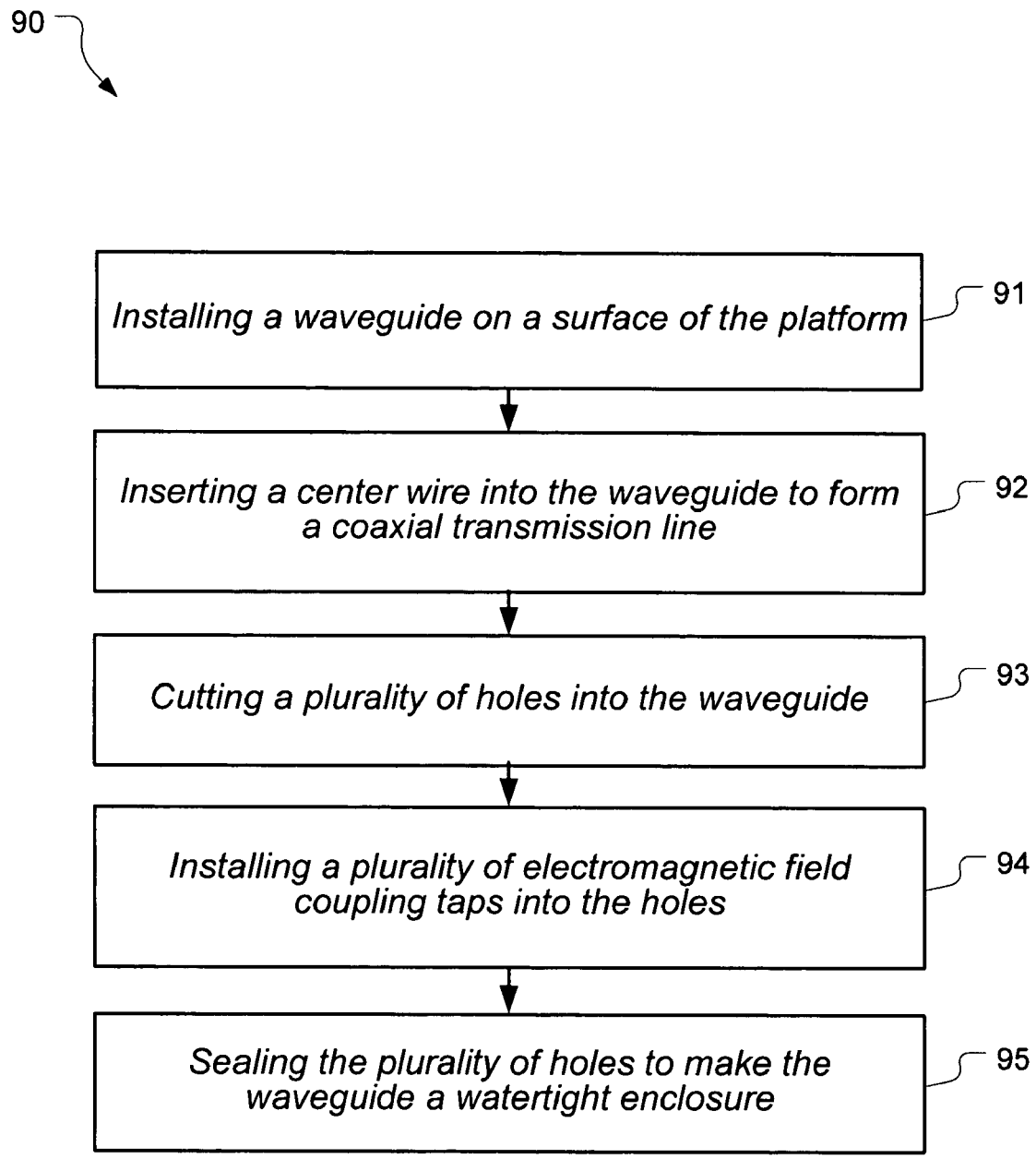
FIG. 10 is a flow chart of a method of installing a sonar array on a platform in accordance with an embodiment of the present invention.

FIG. 9 illustrates a schematic of signal distribution system 70 in accordance with another embodiment of the present invention. The signal distribution system includes a coaxial transmission line 12 which has been separated into two portions. A first portion 12' of the coaxial transmission line has a rigid outer conductor, for example as described above, and is mounted to an exterior hull of a platform. A plurality of taps 20' are affixed to the first portion of the coaxial transmission line. A second portion 12" of the coaxial transmission line is a flexible coaxial cable, which extends from the first portion 12' through the hull 56 via a hull penetrator 86 into an interior of the platform. The rigid first portion of the coaxial transmission line provides benefits in that installation of the taps 20' is relatively easy, while the flexible portion of the coaxial transmission line provides benefits in that it is easily routed and positioned through the hull penetrator.

Insertion of power and extraction of data signals from the coaxial cable 12" can be provided by a diplexer, as described above. Alternately, as shown here, a directional coupler 68 can be used as will now be explained. Power can be injected from a power source 62 into the coaxial transmission line by feeding a power signal 67 into an input port IN of the directional coupler, the output port OUT of the directional coupler being connected to the coaxial cable. The power signal travels in the form of a first electromagnetic wave propagating generally in a forward direction 97 along the coaxial transmission line. The terminating resistor 60 helps to avoid reflections at the end of the coaxial transmission line.

Data signals (modulated radio frequency signals carrying sensor signals from the sensors) are injected by the taps 20' and travel in the form of second electromagnetic waves propagating generally in a reverse direction 98 along the coaxial transmission line 12. The reflected signal port REF of the directional coupler 68 can thus provide output of the data signals 66 and be connected to a receiver 64 for recovery of the sensor signals 75.

The forward signal port FWD of the directional coupler 68 can be used to monitor the power signal 67, if desired. Alternately, a three-port directional coupler may be used, omitting the power monitoring. Additional filtering (not shown) can be included to help avoid interference between the power signal and the data signals 66 if the amount of isolation provided by the directional coupler is less than that desired. A diplexer can also be used in combination with the directional coupler to further enhance separation of the power signal and the data signals.

While the foregoing discussion has principally focused on using a single coaxial transmission line, it should be appreciated that multiple coaxial transmission lines may be used to provide signal distribution for different groups of sensors. For example, a very large sensor array may be divided into rows or columns, and signal distribution system provided for each row or column. As another example, a large sensor array may be divided into sections or quadrants, and a signal distribution system provided for each sector or quadrant.

Further advantages of embodiments of the present invention will become apparent from a description of a method for installing a sonar array on a platform. The method, illustrated in flow chart form in FIG. 9 includes installing 91 a waveguide on a surface of the platform, such as the hull. For example, a rigid, flexible, or combinations of rigid and flexible waveguide can be used to conform to a surface of the platform. A coaxial transmission line is formed by inserting 92 a center wire into the waveguide along the longitudinal axis. The center wire need not be exactly centered within the waveguide, although it will be appreciated that maintaining a roughly constant distance between the center wire and the interior surface of the waveguide helps to maintain constant impedance on the coaxial transmission line. The center wire may be inserted before or after the waveguide is installed onto the surface of the platform. Another step of the method includes cutting 93 a plurality of holes into the waveguide, which can also be performed before, during, or after installation of the waveguide on the surface of the platform.

The method 90 includes installing 94 a plurality of electromagnetic field coupling taps into the holes and sealing 95 the plurality of holes to make the waveguide a watertight enclosure. For example, various ways of installing the taps into the holes are described above. Since no wire connections to the center wire are used, installation of the taps is quite easy. Furthermore, installation of the taps is simplified if the internal field region of the coaxial transmission line has air, gas, or a highly deformable dielectric so that no dielectric material is removed during installation of the taps.

Installation a sonar array onto a platform can include additional steps such as sealing ends of the waveguide, coupling signal interfacing modules (e.g. modulators, power conditioners, and the like) to the electromagnetic field coupling taps, connecting sensors to the signal interfacing modules, and placing one or more ends of the waveguide through a penetration in the hull of the platform.

In conclusion and reiterating to some extent, a technique for wireless transmission of power to/from sensors has been developed. A waveguide can be coupled to the hull of a submarine, converted to a transmission line by insertion of a center conductor, and interfacing modules coupled to the waveguide to wirelessly receive power from the transmission line and wirelessly output modulated sensor signals at a radio frequency into the waveguide. The wireless transmission and reception can be via inductive (magnetic) and/or capacitive (electric) coupling. Direct connections as used in Ohmic conduction can thus be avoided. By using a transverse electromagnetic mode coaxial transmission line, low frequency cutoff as in waveguides is avoided. This enables the use of transmitters, whose carrier or transmission frequencies are much lower than the classical waveguide cutoff, for power transmission thus reducing system complexity and cost.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth by the claims.

What is claimed is:

1. A signal distribution system for a sonar sensor array comprising:
   a coaxial transmission line having an outer conductor and an inner conductor separated by an internal field region;
   a plurality of taps affixed to the outer conductor of the coaxial transmission line along a length of the coaxial transmission line,
   each of the taps having at least one field coupling portion extending through an opening in the outer conductor into the internal field region of the coaxial transmission line to interface with electromagnetic wave energy propagating within the coaxial transmission line;
   a capacitively-coupled probe configured to inject electromagnetic wave energy into the internal field region; and
   an inductively-coupled probe configured to extract electromagnetic wave energy from the internal field region.

2. The system of claim 1, wherein:
   the coaxial transmission line comprises a watertight outer conductor; and
   the plurality of taps each comprises a seal coupled to the watertight outer conductor.

3. The system of claim 1, wherein:
   the outer conductor comprises a waveguide enclosure; and
   the inner conductor comprises an insulated wire inserted within the waveguide enclosure.

4. The system of claim 1, wherein:
the capacitively-coupled probe comprises a plate extending longitudinally and circumferentially within the internal field region; and
the inductively-coupled probe comprises a loop extending longitudinally and radially within the internal field region.

5. The system of claim 1, wherein:
the tap further comprises a modulator coupled to the capacitively-coupled probe and configured to accept a sensor signal, modulate the sensor signal onto a radio frequency signal, and output the radio frequency signal to the capacitively-coupled probe; and
the tap further comprises a power conditioner coupled to the inductively-coupled probe and configured to accept extracted electromagnetic energy from the inductively-coupled probe, condition the extracted electromagnetic energy to form a power signal, and output the power signal.

6. The system of claim 5, further comprising:
a plurality of sensors, each sensor coupled to a tap and configured to provide the sensor signal to the modulator.

7. The system of claim 5, wherein the sensor signal is modulated onto the radio frequency signal in an analog format.

8. The system of claim 5, wherein the sensor signal is modulated onto the radio frequency signal in a digital format.

9. The system of claim 5, further comprising:
a power source coupled to the coaxial transmission line and configured to inject a first electromagnetic wave into the coaxial transmission line; and
a plurality of demodulators coupled to the coaxial transmission line and each configured to extract a sensor signal from a corresponding one of the second electromagnetic waves.

10. The system of claim 9, wherein the modulator is a frequency modulation transmitter and the demodulator is a frequency modulation receiver.

11. The system of claim 9, further comprising a diplexer coupled to the coaxial transmission line to separate the first electromagnetic wave from the second electromagnetic wave, the directional coupler coupled to the power source to accept and inject the first electromagnetic wave and the diplexer coupled to the plurality of demodulators to supply the second electromagnetic waves thereto.

12. The system of claim 9, further comprising a directional coupler coupled to the coaxial transmission line to separate the first electromagnetic wave from the second electromagnetic wave, the directional coupler coupled to the power source to accept and inject the first electromagnetic wave and the directional coupler coupled to the plurality of demodulators to supply the second electromagnetic waves thereto.

13. The system of claim 9, further comprising:
a power source coupled to the coaxial transmission line and configured to inject a first electromagnetic wave into the internal field region;
a plurality of sensors, each sensor coupled to a corresponding tap,
wherein each tap comprises an inductively-coupled field probe configured to extract power from the first electromagnetic wave to power the corresponding sensor, and
wherein each tap further comprises a capacitively-coupled field probe configured to accept a signal from the corresponding sensor and inject the signal in the form of a second electromagnetic wave into the coaxial transmission line; and a receiver subsystem coupled to the coaxial transmission line, wherein the coaxial transmission line penetrates a hull of a platform and the receiver subsystem is located on an opposite side of the hull from the plurality of sensors, the receiver subsystem configured to accept and process the second electromagnetic waves to produce a plurality of outputs corresponding to the sensor signals.

14. The system of claim 1, wherein the system is installed on a platform selected from the group of platforms consisting of a submarine, a ship, a sonobuoy, a shore station, a ground vehicle, and an aircraft.

15. A signal distribution system for a sonar sensor array comprising:
a means for confining a transverse electric and magnetic mode electromagnetic wave within a watertight, elongate wave-propagating region;
plural means for interfacing to the elongate wave propagating region and coupling to at least one electromagnetic wave therein to extract power therefrom and to inject a signal thereto; and
a plurality of sensors disposed external to the means for confining, each sensor powered by a corresponding one of the plural means for interfacing and each sensor outputting a signal to the corresponding one of the plural means for interfacing.

16. The signal distribution system of claim 15 wherein the interfacing means comprises:
a means for injecting a data-signal carrying electromagnetic wave into the means for confining; and
a means for extracting electrical power from an electromagnetic wave propagating in the means for confining.

17. A method of installing a sonar array on a platform comprising:
installing a waveguide on a surface of the platform;
inserting a center wire into the waveguide to form a coaxial transmission line;
cutting a plurality of holes into the waveguide;
installing a plurality of electromagnetic field coupling taps into the holes; and
sealing the plurality of holes to make the waveguide a watertight enclosure.

18. The method of claim 17, further comprising sealing ends of the waveguide.

19. The method of claim 17, further comprising coupling a plurality of signal interfacing modules to corresponding electromagnetic field coupling taps.

20. The method of claim 19, further comprising connecting a plurality of sensors to corresponding signal interfacing modules.

21. The method of claim 17, further comprising:
placing an end of the waveguide through a penetration in the hull of the platform.

22. The method of claim 17, wherein the platform is a submarine, a ship, a sonobuoy, a shore station, a ground vehicle, or an aircraft.

23. A method of distributing signals within a sonar array, comprising
propagating a first electromagnetic wave at a first frequency along a coaxial transmission line;
inductively coupling to the first electromagnetic wave at a plurality of extraction points distributed along the coaxial transmission line to supply power for a plurality of sensors;
capacitively injecting a plurality of second electromagnetic waves into the coaxial transmission line at a plurality of injection points distributed along the coaxial transmission line, the plurality of second electromagnetic waves comprising a plurality of sensor signals from the sensors; and receiving the plurality of second electromagnetic waves at a receiver to extract the plurality of sensor signals.

24. The method of claim 23 wherein corresponding injection and extraction points are the same point.

25. The method of claim 23 wherein capacitively injecting a plurality of second electromagnetic waves comprises frequency modulating each of the signals from the sensors onto a corresponding second electromagnetic wave.

26. The method of claim 25 wherein receiving the plurality of second electromagnetic waves comprises frequency demodulating each of the second electromagnetic waves.

27. A signal distribution system for a sonar sensor array comprising:

a coaxial transmission line having an outer conductor and an inner conductor separated by an internal field region; and a plurality of taps affixed to the outer conductor of the coaxial transmission line along a length of the coaxial transmission line, each of the taps having at least one field coupling portion extending through an opening in the outer conductor into the internal field region of the coaxial transmission line to interface with electromagnetic wave energy propagating within the coaxial transmission line, wherein the system is installed on a platform selected from the group of platforms consisting of a submarine, a ship, a sonobuoy, a shore station, a ground vehicle, and an aircraft.

* * * * *